(12) United States Patent
Hamlik et al.

(10) Patent No.: US 11,370,645 B2
(45) Date of Patent: Jun. 28, 2022

(54) SYSTEM FOR PARASITIC POWER GENERATION AND CONTROL OF A LOAD-HANDLER FOR A LIFT TRUCK

(71) Applicant: Rightline Equipment, Inc., Rainer, OR (US)

(72) Inventors: Jim D. Hamlik, Vancouver, WA (US); Joel D. Hamlik, Vancouver, WA (US)

(73) Assignee: Rightline Equipment, Inc., Rainier, OR (US)

( * ) Notice: Subject to any disclaimer, the term of this patent is extended or adjusted under 35 U.S.C. 154(b) by 322 days.

(21) Appl. No.: 16/334,696

(22) PCT Filed: Sep. 19, 2017

(86) PCT No.: PCT/US2017/052358
§ 371 (c)(1),
(2) Date: Mar. 19, 2019

(87) PCT Pub. No.: WO2018/053553
PCT Pub. Date: Mar. 22, 2018

(65) Prior Publication Data
US 2019/0210851 A1 Jul. 11, 2019

Related U.S. Application Data

(60) Provisional application No. 62/396,425, filed on Sep. 19, 2016.

(51) Int. Cl.
*B66F 9/20* (2006.01)
*B66F 9/22* (2006.01)

(52) U.S. Cl.
CPC ............... *B66F 9/205* (2013.01); *B66F 9/22* (2013.01)

(58) Field of Classification Search
CPC .................................. B66F 9/205; B66F 9/22
See application file for complete search history.

(56) References Cited

U.S. PATENT DOCUMENTS 6,662,881 B2 * 12/2003 Domann ............... E02F 3/3609
172/272
9,702,349 B2 7/2017 Anderson
(Continued)

OTHER PUBLICATIONS

Blaine R. Copenheaver, Written Opinion of the International Searching Authority, PCT/US2017/052358, dated Dec. 1, 2017, pp. 1-20, IPEA/USPTO, Alexandria VA, USA.
(Continued)

*Primary Examiner* — F Daniel Lopez
(74) *Attorney, Agent, or Firm* — Rylander & Associates, PC; Philip R. M. Hunt

(57) ABSTRACT

A system for parasitic power generation and control of a load-handler configured to be coupled to a lift truck, with a parasitic energy convertor mounted on the load-handler and coupled via a hydraulic feed line to a hydraulic pump on the lift truck. The parasitic energy convertor configured to generate electrical power for components of the load-handler, including a load-side control transceiver. The load-side control transceiver is configured for controlling control valves based on commands received wirelessly from a truck-side control transceiver. The load-side control transceiver configured for monitoring and control of the load-handler including event logging and notification of maintenance needed.

29 Claims, 8 Drawing Sheets

(56) References Cited

U.S. PATENT DOCUMENTS

| | | |
|---|---|---|
| 2004/0069497 A1 | 4/2004 | Jones |
| 2006/0115354 A1 | 6/2006 | Prentice |
| 2006/0115454 A1 | 6/2006 | Prentice |
| 2010/0207390 A1 | 8/2010 | Zimmermann |
| 2012/0006013 A1 | 1/2012 | McBride |
| 2015/0224845 A1 | 8/2015 | Anderson |
| 2016/0254677 A1 | 9/2016 | McKernan |

OTHER PUBLICATIONS

Frank Daneil Lopez, International Preliminary Report on Patentability, PCT/US2017/052358, dated Jan. 26, 2019, pp. 1-40, IPEA/USPTO, Alexandria VA, USA.

* cited by examiner

SYSTEM FOR PARASITIC POWER GENERATION AND CONTROL OF A LOAD-HANDLER FOR A LIFT TRUCK

CROSS-REFERENCE TO RELATED APPLICATIONS

This application is a National Stage Entry under 35 U.S.C. 371, of International Application PCT/US17/052358, filed 2017 Sep. 19, which claims the benefit of U.S. Provisional Application No. 62/396,425, filed 2016 Sep. 19, all incorporated herein by reference.

TECHNICAL FIELD

The present invention relates to cargo handling equipment. More particularly, the present invention relates to control and electrical power systems for use primarily on load-handler attachments for lift trucks.

BACKGROUND

Material handling vehicles such as lift trucks are used to pick up and deliver loads between stations. A typical lift truck system 10 comprises a lift truck 24 and a load-handler 22 detachably coupled to the lift truck 24. The lift truck has mast 12 and a carriage 14 to which a load-handler 22 may be attached. The lift truck 24 is configured for raising and lowering the carriage 14 (and any load-handler 22 attached thereto) up and down the mast 12 (see FIG. 1). The carriage 14 typically has one or more carriage bars 16 to which the load-handler 22 is mounted. The carriage bars 16 are typically coupled to the mast in a way that allows the lift truck system 10 to move the carriage bars 16 up and down, but not laterally relative to the truck. Typically, there are different types of load-handlers available for detachably coupling to a lift truck 24. One type of load-handler 22 may be detachably coupled to the lift truck 24 and then swapped out for a different type. The one typical type of load-handler 22 comprises a pair of forks 20 coupled to a fork frame 18 (shown in FIG. 1). Another common type of load-handler 22 is a load clamp (shown in FIG. 2).

The components of a load-handler 22 typically need to be repositioned during operation. For example, an operator of the lift truck system 10 shown in FIG. 1 needs to maneuver the forks 20 beneath a load prior to lifting it. In the course of moving different loads, the operator may need to change the lateral position of the forks 20 relative to each other. To change the lateral position of the forks 20 on the lift truck system 10 shown in FIG. 1, the operator must dismount from the lift truck 24 and manually reposition the forks 20. In contrast, a load-handler with a powered fork positioner (not shown) would allow the operator of a lift truck so equipped to change the lateral position of the forks without dismounting from the lift truck. This can save effort, time and money. A typical powered fork positioner uses hydraulic actuators mounted to the fork frame to move the forks relative to the fork frame. A fork positioner may be combined with a side shifter. A typical side shifter uses hydraulics for laterally displacing the fork frame with respect to the center line of the lift truck. A hydraulic actuator coupling the carriage to the fork frame provides the shifting action.

FIG. 2 shows a lift truck system 10 with a load clamp type of load-handler 22 attached (See FIG. 2). A load clamp assembly typically comprises a frame 40, one or more actuators 36 and two clamp arms 34. The actuators 36 are configured to move the clamp arms 34 toward or away from each other. In use, the operator of the lift truck system 10 approaches a load to be carried, such as a stack of cartons or a large appliance, such as a refrigerator. As the lift truck system 10 approaches the load, the operator uses controls to open the gap between the clamp arms 34 wider than the load and may adjust the height of the clamp arms 34 so they will engage the load in a suitable location. The operator then maneuvers the lift truck system 10 to straddle the load between the clamp arms 34. When the clamp arms 34 are positioned suitably around the load, the operator uses controls to bring the clamp arms 34 together, grasping the load. The operator then uses other controls to raise the load clamp assembly, raising the load off the floor, the load held between the clamp arms 34 by friction. The operator then drives the load to a desired location.

Hydraulically powered components for load-handlers 22 are well known, but until recently the control systems for such load-handlers 22 and their various hydraulic components typically comprised manually operated hydraulic valves located on the lift truck 24 within reach of the operator. For each hydraulic actuator located on load-handler 22, one or more hydraulic lines had to be run from the lift truck 24 to the load-handler 22. The more actuators, the more hydraulic lines required. Multiple hydraulic lines are undesirable. Since the carriage 14 has the ability to move up and down the mast 12 and the load-handler 22 typically has the ability to move left and right relative to the carriage 14, the hydraulic lines must be flexible and must have sufficient slack to allow the full range of motion of the load-handler 22. The slack must be managed so that the flexible lines do not become caught in any of the lift truck system 10 moving components and slack management solutions become more complicated with more lines. Furthermore, with all the actuators on the load-handler 22, it is already difficult to ensure that the operator's view is not too obstructed. The more flexible hydraulic lines there are, the more likely that they will obstruct the operator's view. Additionally, flexible hydraulic lines are more prone to failure than non-flexible hydraulic lines and require more maintenance.

U.S. Pat. No. 8,403,618 to Prentice offers a solution to the problems of multiple flexible hydraulic lines between the lift truck and the load-handler. Prentice describes a system with a single set of flexible hydraulic lines between the lift truck and the load-handler. The control valves for the actuators are electrically operated and located on the load-handler. A battery mounted on the load-handler powers a control system (also mounted on the load-handler) and the solenoid-operated control valves. The load-handler control system receives wireless commands from a transceiver in the lift truck and operates the control valves accordingly. However, solenoid-operated valves consume power at a rapid rate when actuated, so it is necessary to replace or recharge the batteries often.

One solution to recharging is to have a power cable from the battery and/or generator on the lift truck to the load-handler with sufficient slack and slack cable management to accommodate relative movement between the lift truck, the carriage and the fork frame. With this solution, no battery is needed. However, this solution is as undesirable as the multiple sets of hydraulic lines and for the same reasons. US 20160233687 by McKernan teaches a different solution replacing the power cable with induction couplings at the junctions between moving parts, such as between the mast and the carriage. However, this requires the mast and carriage to be in a certain position, usually the lowest position of the carriage, for power to flow and the battery to charge. If the lift truck is left for a sufficient period of time with the carriage out of this position, the battery can discharge. When the battery is discharged, the actuators for the side shifters and fork positions cannot be operated until the battery is recharged, which may lead to some unintended down time. The induction coupling requires an involved installation, tapping into the battery on the truck and installing additional brackets and wires on the truck.

BRIEF DESCRIPTION OF THE DRAWINGS

The accompanying drawings, which are incorporated into and constitute a part of this specification, illustrate one or more embodiments of the inventive subject matter and, together with the detailed description, serve to explain the principles and implementations thereof. Like reference numbers and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

DETAILED DESCRIPTION

In describing the one or more representative embodiments of the inventive subject matter, use of directional terms such as "upper," "lower," "above," "below", "in front of" "behind," etc., unless otherwise stated, are intended to describe the positions and/or orientations of various components relative to one another as shown in the various Figures and are not intended to impose limitations on any position and/or orientation of any component relative to any reference point external to the Figures.

In the interest of clarity, not all of the routine features of representative embodiments of the inventive subject matter described herein are shown and described. It will, of course, be appreciated that in the development of any such actual implementation, numerous implementation-specific decisions must be made in order to achieve specific goals, such as compliance with application and business-related constraints, and that these specific goals will vary from one implementation to another and from one developer to another. Those skilled in the art will recognize that numerous modifications and changes may be made to the representative embodiment(s) without departing from the scope of the claims. It will, of course, be understood that modifications of the representative embodiments will be apparent to those skilled in the art, some being apparent only after study, others being matters of routine mechanical, chemical and electronic design. No single feature, function or property of the representative embodiments is essential. In addition to the embodiments described, other embodiments of the inventive subject matter are possible, their specific designs depending upon the particular application. As such, the scope of the inventive subject matter should not be limited by the particular embodiments herein described but should be defined only by the appended claims and equivalents thereof.

First Exemplary Embodiment

Figure 1:
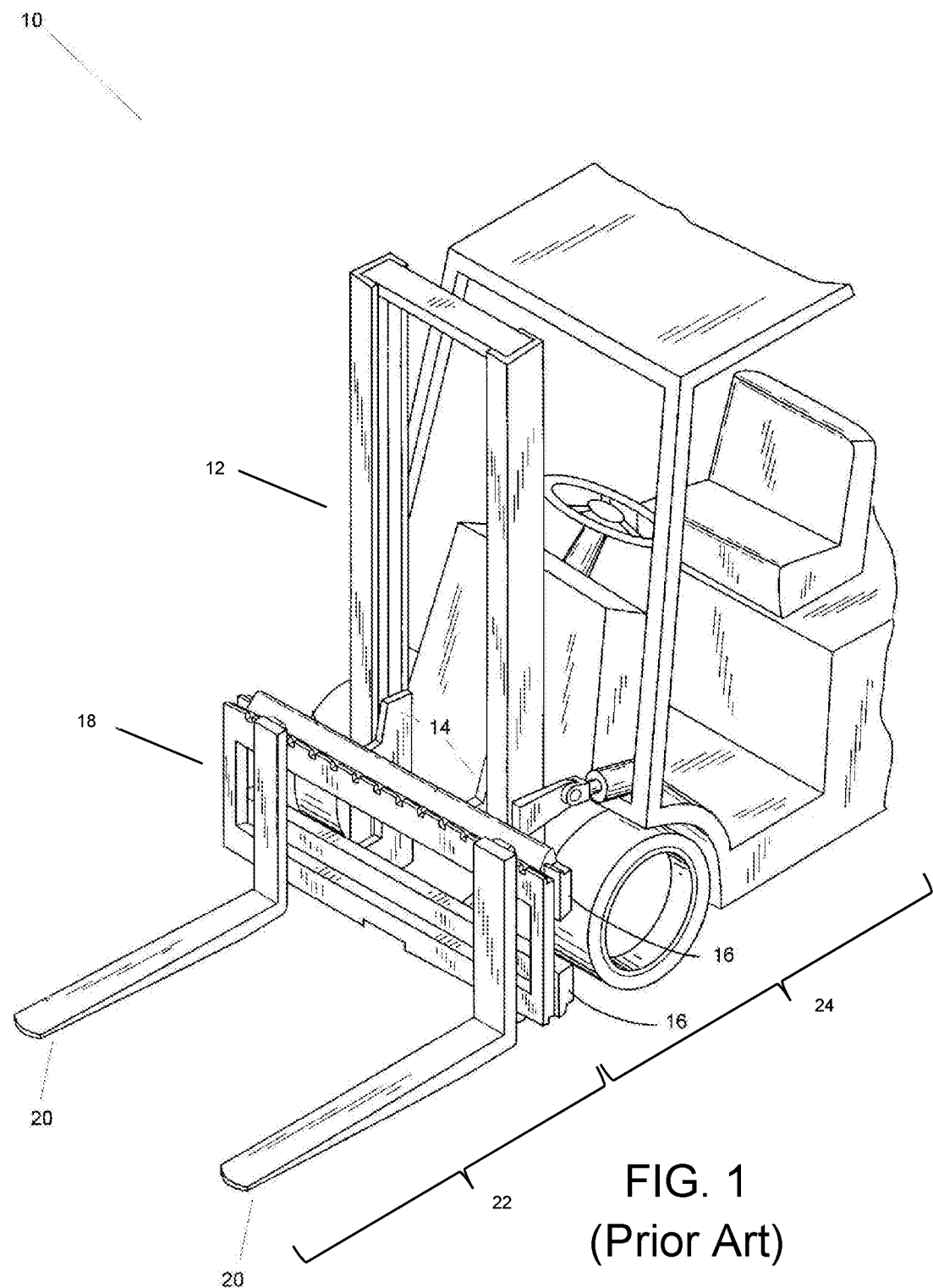
FIG. 1 shows a lift truck (prior art).
Figure 2:
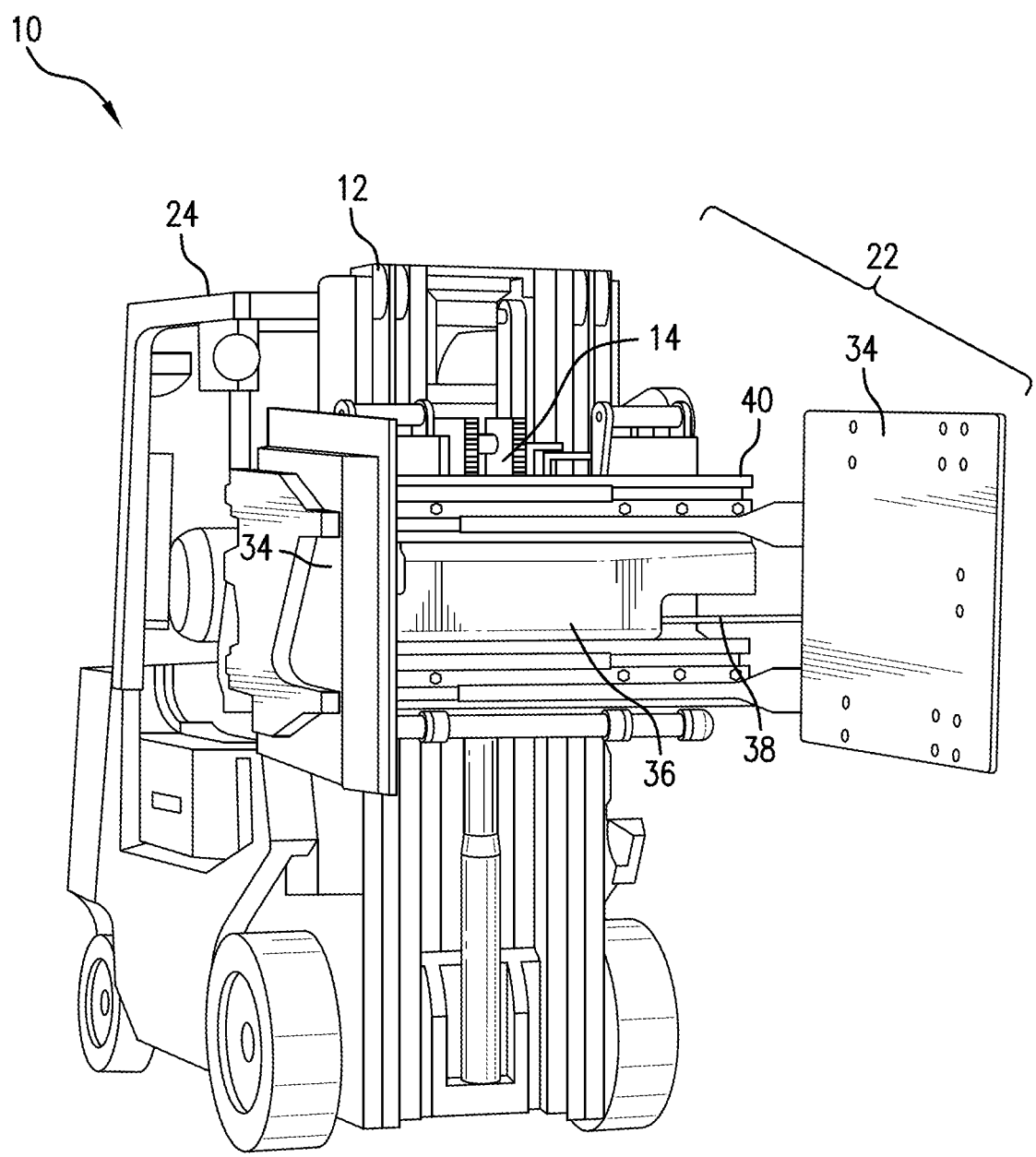
FIG. 2 is an isometric view of a prior art lift truck, illustrating typical components of a lift truck equipped with a load clamp assembly (prior art).
Figure 3:
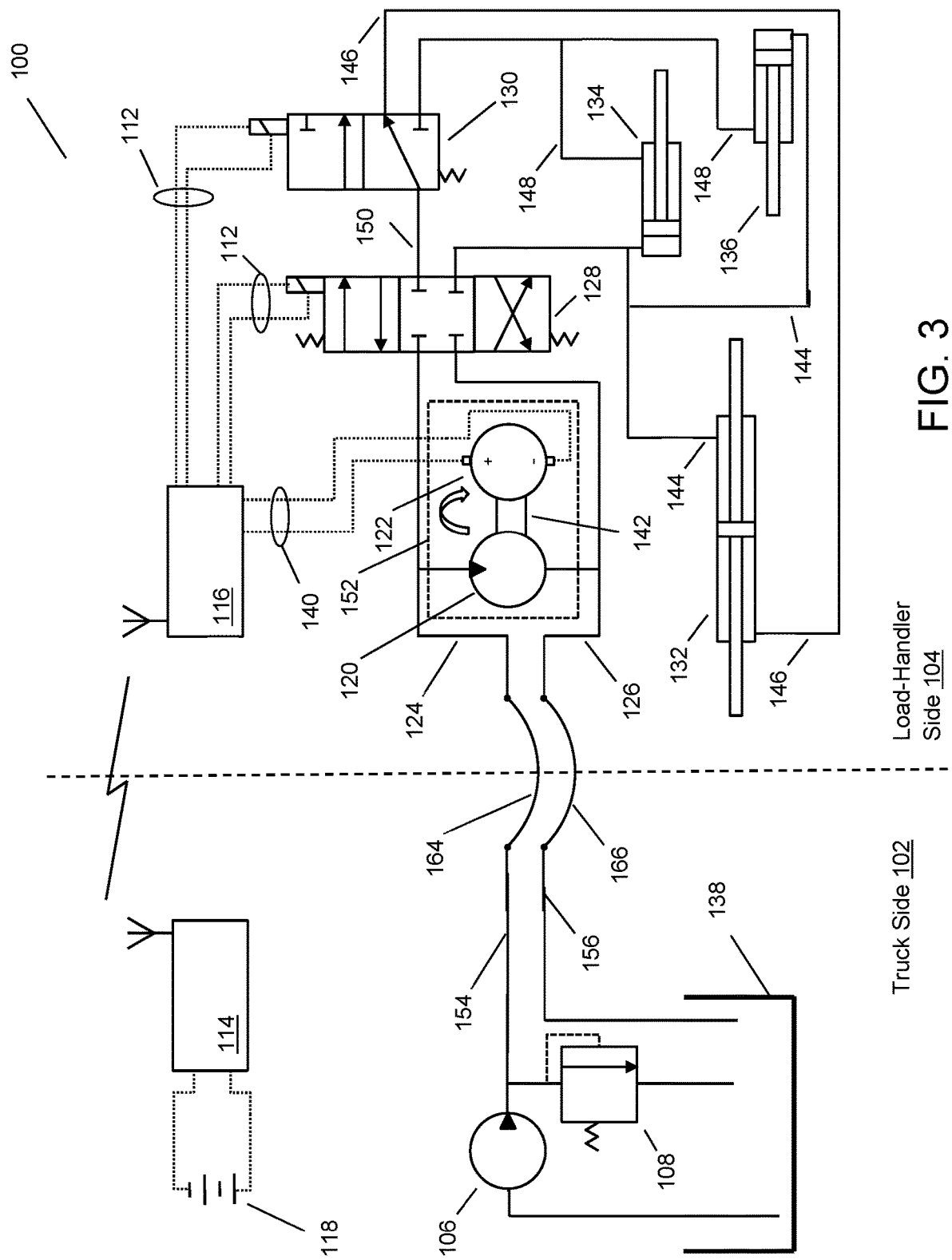
FIG. 3 shows a schematic drawing of a first exemplary embodiment of a parasitic power generator system.

FIG. 3 shows a schematic drawing of a first exemplary embodiment of a parasitic power generation and control system 100 of a load-handler for a lift truck and some lift truck components to which the first embodiment system is configured to couple to and operate with. The first embodiment system 100 is configured for wirelessly controlling from the lift truck 24 one or more hydraulic actuators mounted on the load-handler 22, actuators such as a side shifter actuator 132, a right fork positioner 134 and a left fork positioner 136. The schematic is divided into a truck side 102 and a load-handler side 104. The truck side 102 on the left of FIG. 3 shows components mounted on the lift truck 24. The load-handler side 104 on the right side of FIG. 3 shows components mounted on the load-handler 22 of the lift truck system 10.

On the truck side 102, the first embodiment system 100 is coupled to a hydraulic pump 106 to supply pressurized hydraulic fluid. The hydraulic pump 106 draws hydraulic fluid out of a hydraulic fluid reservoir 138. The hydraulic pump 106 is typically powered by the main engine of the lift truck system 10 by belt or gear drives, though in some cases it may be driven by an electric motor powered by lift truck power supply 118. The outlet of the hydraulic pump 106 is coupled to a relief valve 108 which regulates the pressure produced by the hydraulic pump 106 and provides a discharge path for excess hydraulic fluid that is not needed at the moment by the first embodiment system 100. The output of the hydraulic pump 106 is coupled to a lift truck feed line 154. A lift truck return line 156 brings hydraulic fluid back to the hydraulic fluid reservoir 138. The hydraulic pump 106, relief valve 108, hydraulic fluid reservoir 138, lift truck feed line 154, lift truck return line 156 are coupled to the first exemplary embodiment parasitic power generation and control system 100, but are pre-existing equipment on the lift truck 10 and typically come standard with the lift truck 10.

A truck-side control transceiver 114 is configured to take control inputs and transmit commands wirelessly. The control inputs may be levers similar to traditional hydraulic control levers familiar to fork lift operators, but operating electrical switches that provide control inputs rather than operating hydraulic control valves directly. Alternatively, the control inputs may be buttons or switches or even capacitive touch screens. The truck-side control transceiver 114 is powered by a lift truck power supply 118. The lift truck power supply 118 may be a battery or a generator that powers the lift truck system 10.

The lift truck feed line 154 and lift truck return line 156 is coupled to a load-handler feed line 124 and a load-handler return line 126, respectively, crossing over from the truck side 102 to the load-handler side 104 via a feed line jumper 164 and a return line jumper 166, which are flexible connections that have sufficient slack to handle the relative motion between the load-handler 22 and the lift truck 24. A parasitic energy convertor 152 mounted on the load-handler 22, is coupled to the load-handler feed line 124 and load-handler return line 126. The parasitic energy convertor 152 takes energy from the hydraulic fluid in the load-handler feed line 124 and converts it to electrical power for use by other components mounted on the load-handler 22. In the first embodiment system 100, the parasitic energy convertor 152 is an electro-mechanical energy conversion device, converting the mechanical energy of the hydraulic fluid into rotational energy and then to electrical energy. In other embodiments, the parasitic energy convertor 152 may be some other type of device that extracts energy from the hydraulic fluid and converts it to electrical energy, such as a thermo-electric generator.

In the first embodiment system 100, the parasitic energy convertor 152 comprises a hydraulic motor 120 and an electric generator 122. The hydraulic motor 120, is coupled to the load-handler 22. High pressure hydraulic fluid from the hydraulic pump 106 enters the hydraulic motor 120 via the load-handler feed line 124, causing the hydraulic motor 120 to turn a shaft 142. The hydraulic fluid then exits the hydraulic motor 120 via the load-handler return line 126. The shaft 142 turns an electric generator 122, which generates electrical power. In the first embodiment, the electric power is direct current, but in other embodiments may be alternating current. In some embodiments, the hydraulic motor 120 and electric generator 122 are mounted to the fork frame 18, but in other embodiments they are mounted to other parts of the load-handler 22, such as the carriage 14. In some embodiments, the hydraulic motor 120 and electric generator 122 are a combined unit in a single housing. In other embodiments, the hydraulic motor 120 and electric generator 122 are discrete components, each in their own housing and each separately mounted to the load-handler 22.

The electrical power for the electric generator 122 powers a load-side control transceiver 116. The load-side control transceiver 116 is configured to receive commands from the truck-side control transceiver 114. In the first embodiment system 100, the load-side control transceiver 116 is also configured for transmitting information back to the truck-side control transceiver 114 about its status, the status of the electric generator 122 and other components of the system mounted on the load-handler 22. However, in some alternative embodiments, the truck-side control transceiver 114 only transmits and the load-side control transceiver 116 only receives.

The load-side control transceiver 116 controls one or more hydraulic control valves, including a load-handler directional control valve 128 and a multi-component control valve 130. The load-handler directional control valve 128 and multi-component control valve 130 are solenoid operated, controlled by the load-side control transceiver 116 via control valve wirings 112. The load-handler directional control valve 128 controls the direction of hydraulic fluid flow and the multi-component control valve 130 controls which actuators are selected for operation.

The load-handler directional control valve 128 is a solenoid operated, three-position, four-port valve with a normally closed position, a straight-flow position and a cross-flow position. When the load-handler directional control valve 128 is in the closed position, all four-ports are blocked. When the load-handler directional control valve 128 is in the straight-flow position, a first port of the load-handler directional control valve 128, coupled to the load-handler feed line 124, is ported through to an inter-valve hydraulic line 150 that couples to a first port of the multi-component control valve 130 and a second port of the load-handler directional control valve 128, coupled to the load-handler return line 126, is ported through to a first actuator hydraulic line 144. When the load-handler directional control valve 128 is in the cross-flow position, the first port of the load-handler directional control valve 128, coupled to the load-handler feed line 124, is ported through to a first actuator hydraulic line 144 and the second port of the load-handler directional control valve 128, coupled to the load-handler return line 126, is ported through to an inter-valve hydraulic line 150 that couples to a first port of the multi-component control valve 130.

The multi-component control valve 130 is a two position, three port valve with one input port and two output ports. When in a first position, the multi-component control valve 130 couples the input port, coupled to the inter-valve hydraulic line 150, with a first output port, coupled to a second actuator hydraulic line 146 while the second output port, coupled to a third actuator hydraulic line 148 is blocked. When in a second position, the multi-component control valve 130 couples the input port, coupled to the inter-valve hydraulic line 150, with the second output port, coupled to a third actuator hydraulic line 148, while the first output port, coupled to a second actuator hydraulic line 146 is blocked. In other embodiments, the multi-component control valve 130 could have additional output ports to control additional sets of hydraulic actuators.

The first actuator hydraulic line 144 couples to a first side of the side shifter actuator 132, to a first side of the right fork positioner 134, and to a first side of the left fork positioner 136. The second actuator hydraulic line 146 couples to a second side of the side shifter actuator 132. The third actuator hydraulic line 148 couples to a second side of the right fork positioner 134 and a second side of the left fork positioner 136.

The first embodiment system 100 operates as follows. The lift truck system 10 starts up and the hydraulic pump 106 begins to pump hydraulic fluid out of the hydraulic fluid reservoir 138, into the lift truck feed line 154 and then into the load-handler feed line 124. Hydraulic fluid passes through the parasitic energy convertor 152, which extracts energy of some form from the hydraulic fluid and coverts it to electrical energy. The hydraulic fluid then passes into the load-handler return line 126 and back to the hydraulic fluid reservoir 138. Electrical energy from the parasitic energy convertor 152 powers up the load-side control transceiver 116, which then queries the truck-side control transceiver 114 for commands and continues to monitor for commands from the truck-side control transceiver 114. When the truck-side control transceiver 114 receives a command to move the forks closer, it transmits commands to the load-side control transceiver 116 via wireless transmission. The load-side control transceiver 116, powered by the parasitic energy convertor 152, transmits a command to the multi-component control valve 130 to select the fork positioners by moving the multi-component control valve 130 to the second position, which couples the input port and inter-valve hydraulic line 150 to the second output port and the third actuator hydraulic line 148. The load-side control transceiver 116 then transmits a command to the load-handler directional control valve 128 via control valve wiring 112 to move into the straight through position. This couples the load-handler feed line 124 through to the inter-valve hydraulic line 150, thence to the third actuator hydraulic line 148, thence into the second side of the right fork positioner 134 and the second side of the left fork positioner 136, pushing the forks closer together. Since the first actuator hydraulic line 144 is coupled to the load-handler return line 126, hydraulic fluid from the first side of the right fork positioner 134 and first side of the left fork positioner 136 can flow back to the hydraulic fluid reservoir 138. When the forks are in the desired position, the lift truck operator terminates the movement command to the truck-side control transceiver 114, which passes it on wirelessly to the load-side control transceiver 116. The load-side control transceiver 116 terminates the signal to the load-handler directional control valve 128, allowing it to return to the closed position, preventing further movement of the actuators. The load-side control transceiver 116 may then terminate the signal to the multi-component control valve 130, allowing it to return to the first position.

When the truck-side control transceiver 114 receives a command to move the forks apart, the sequence of events is largely the same as for moving the forks closer together, except the load-side control transceiver 116 signals the load-handler directional control valve 128 to move to the cross-over position. This couples the load-handler feed line 124 to the first actuator hydraulic line 144 putting hydraulic pressure into the first side of the side shifter actuator 132, the first side of the right fork positioner 134 and the first side of the left fork positioner 136. It also couples the third actuator hydraulic line 148 to the load-handler return line 126 via the multi-component control valve 130 and inter-valve hydraulic line 150. Since the third actuator hydraulic line 148 is coupled to the load-handler return line 126, hydraulic fluid can leave the second side of the right fork positioner 134 and the second side of the left fork positioner 136 and return to the hydraulic fluid reservoir 138, allowing the right fork positioner 134 and left fork positioner 136 to move the forks closer together. The side shifter actuator 132 cannot move even though it has hydraulic pressure applied to its first side because the second side is only coupled to the second actuator hydraulic line 146, which is blocked by the multi-component control valve 130.

Operation for the side shifter actuator 132 is performed in a similar way, but with the multi-component control valve 130 remaining in the first position.

Second Exemplary Embodiment

Figure 4:
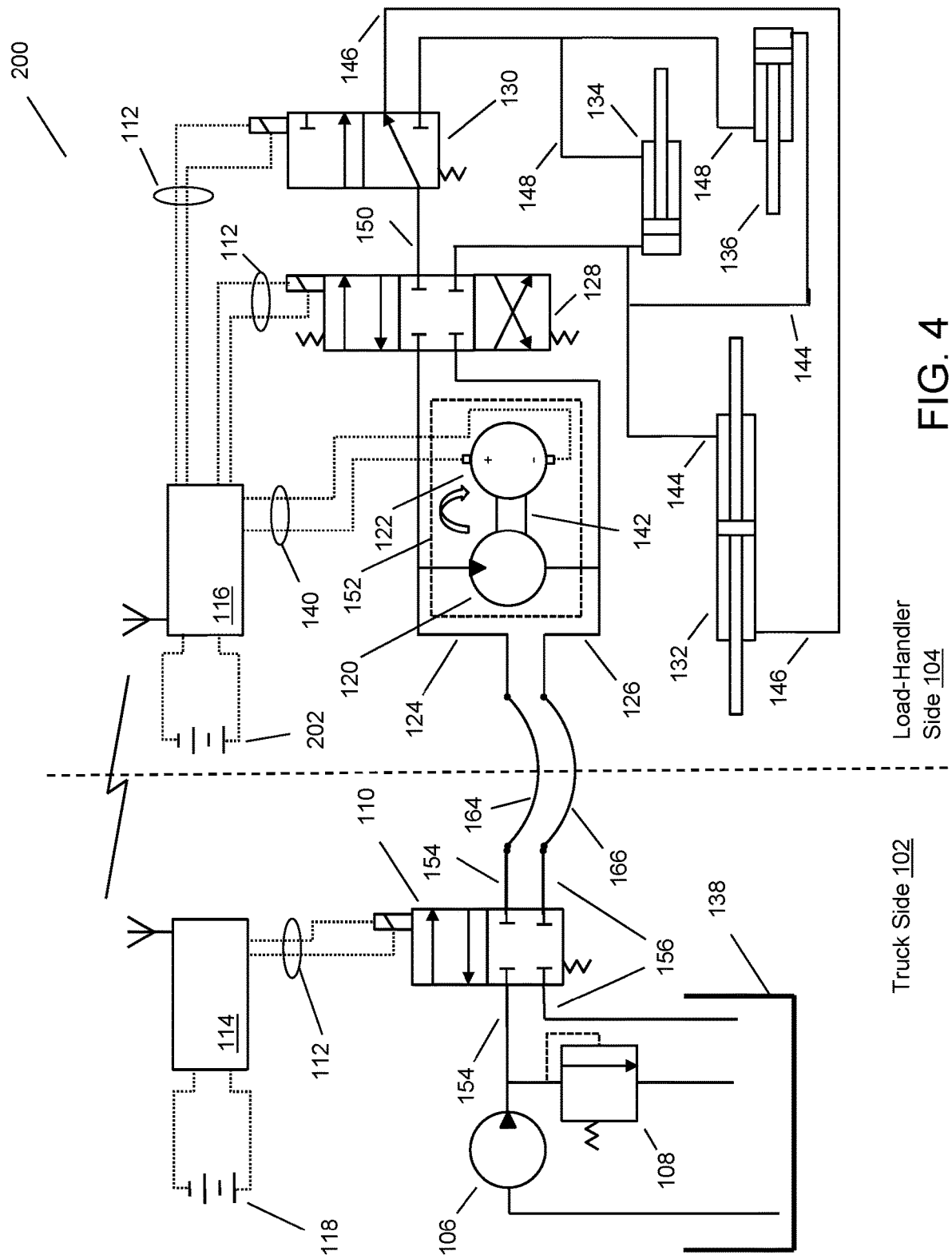
FIG. 4 shows a schematic drawing of a second exemplary embodiment of a parasitic power generator system.

FIG. 4 shows a schematic drawing of a second exemplary embodiment of a parasitic power generation and control system a parasitic power generator system 200 of a load-handler for a lift truck. The second embodiment system 200 is similar to the first embodiment system 100 shown in FIG. 3, but with some differences, including the addition of a truck control valve 110 in line with the lift truck feed line 154 and lift truck return line 156. The truck-side control valve 110 is a solenoid operated, two-position, four-port valve with a normally closed position and a straight-flow position. The truck control valve 110 prevents continual operation of the parasitic energy convertor 152, limiting wear and tear on its components. The truck control valve 110 also serves to prevent continual flow of hydraulic fluid between the lift truck 24 and the load-handler 22. It is safer if flow is not continuous. For example, it is safer not to have flow if a break occurs in the feed line jumper 164 and/or return line jumper 166. Breaks in these lines are most likely to occur when the lift truck system 10 is raising or lowering the load-handler 22 up or down the mast 12, and for load stability reasons, it is better that the actuators on the load-handler 22 are not operated at the same time.

When the truck control valve 110 is in the closed position, the output of the hydraulic pump 106 is blocked, so it pushes hydraulic fluid instead through the relief valve 108. The connection between the lift truck feed line 154 and the load-handler feed line 124 is blocked as well as the connection between the lift truck return line 156 and the load-handler return line 126, so no hydraulic fluid moves through them. The hydraulic motor 120 does not operate and the parasitic energy convertor 152 does not produce electrical power. When the truck control valve 110 is in the straight-flow position, the output of the hydraulic pump 106 is ported to the load-handler feed line 124 and the load-handler return line 126 is ported to the hydraulic fluid reservoir 138. The hydraulic motor 120 operates and the parasitic energy convertor 152 generates power.

The truck control valve 110 is controlled by the truck-side control transceiver 114 via control valve wiring 112. When the truck-side control transceiver 114 receives commands from the fork lift operator, the first step it performs is to send a signal to the truck control valve 110 to move to the straight-flow position. It then waits a small interval of time for the parasitic energy convertor 152 to provide power to the load-side control transceiver 116. After the load-side control transceiver 116 has powered up, then the truck-side control transceiver 114 can send commands to the load-side control transceiver 116. Operation then proceeds as in the first embodiment.

To avoid the time delay while the load-side control transceiver 116 is powering up, a backup battery 202 can supply power to the load-side control transceiver 116, allowing it to operate continuously and receive commands at any time. The backup battery 202 can be recharged by the parasitic energy convertor 152. The load-side control transceiver 116 can monitor the charge state of the backup battery 202 and request the truck control valve 110 be opened or held open (straight-flow position) until the backup battery 202 is sufficiently recharged.

Third Exemplary Embodiment

Figure 5:
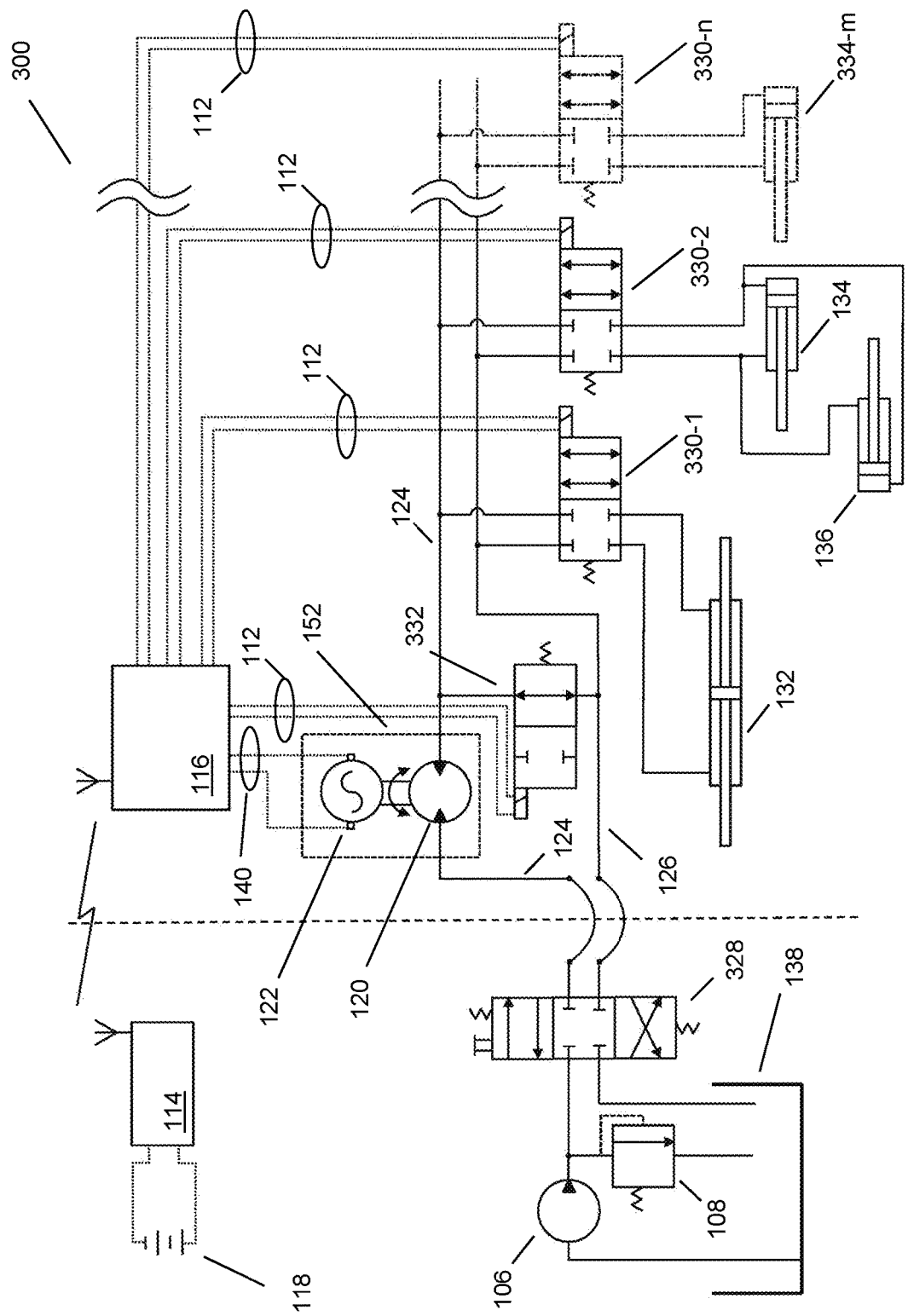
FIG. 5 shows a schematic drawing of a third exemplary embodiment of a parasitic power generator system.

FIG. 5 shows a schematic drawing of a third exemplary embodiment of a parasitic power generation and control system 300 of a load-handler for a lift truck. The third embodiment system 300 is similar to the first embodiment system 100 shown in FIG. 3, but with some differences. There is no load-handler directional control valve 128 on the load-handler side 104. Instead, the third embodiment system relies on a truck directional control valve 328 that is typically already mounted as standard equipment on the lift truck. Instead of a single multi-component control valve 130 as in the first embodiment system 100, in the third embodiment system 300 each actuator on the load-handler side 104 is hydraulically coupled with a two-position component control valve 330 (e.g. 330-1, 330-2, 330-$n$) in series with the actuator and in parallel with the other two-position component control valves 330. The hydraulic motor 120 of the parasitic energy convertor 152 is coupled in series with the actuators on the load-handler side 104 (e.g. side shifter actuator 132, right fork positioner 134, left fork positioner 136, mth actuator 334-$m$) rather than in parallel as in the first embodiment system 100. With the parasitic energy convertor 152 in parallel with the actuators, the parasitic energy convertor 152 can suffer loss of electrical power output when one or more of the actuators is operating. This problem is avoided in the serial configuration.

The components of a plurality of hydraulic components are in series with each other if they are coupled such that the same flow that passes on a single path through one also passes through the other components. The flow rate though all of them in steady state is substantially the same. The components of a plurality of hydraulic components are in parallel with each other if a flow through the plurality of components is divided into multiple flows on multiple paths, one path through each of the components. The flow rate through one of the components in steady state may be the same or different than the flow rate through other of the components and the flow rates through some of the components may be zero at times. A group of components, itself combined in series or parallel or both, may itself be in parallel with other components or other groups of components. When some of the components in a hydraulic circuit can allow flow or block flow at different times (e.g. valves), they are described as to whether they are in parallel or series with other components based on their flow allowing state.

The parasitic energy convertor 152 is in series with the actuators on the load-handler side 104 because the parasitic energy convertor 152 is coupled in line with the load-handler feed line 124 with a hydraulic inlet of the parasitic energy convertor 152 coupled to a first portion of the load-handler feed line 124 that runs toward the hydraulic pump 106 (when the truck directional control valve 328 is in its straight-flow position) and with its hydraulic outlet coupled to a second portion of the load-handler feed line 124 that runs towards the hydraulic inlets of the actuators. Thus, a flow from the hydraulic pump 106 that passes through the parasitic energy convertor 152 will also pass through the group of two-position component control valves 330 and the actuators associated with each, though each of the two-position component control valves 330 are in parallel with each other because the flow that passes through the parasitic energy convertor 152 is divided between them if all the two-position component control valves 330 are in open (strait-flow) positions. This serial/parallel description does not change if the truck directional control valve 328 is in a cross-flow position and the flow through the two-position component control valves 330 and the parasitic energy convertor 152 is reversed.

The third embodiment system 300 is configured to be part of a load-handler that will operate plug-and-play with a typical lift truck with minimal retrofitting to the lift truck, just the installation of the truck-side control transceiver 114, but no installing additional control levers, control valves, brackets or wires on the truck. The third embodiment system 300 is configured to operate with a three position, four port control valve commonly mounted as standard equipment on lift trucks, such as the truck control valve 328 shown in FIG. 5. The truck directional control valve 328 is typically a manually operated valve, but in some embodiments, may be a solenoid operated valve. The truck-side control transceiver 114 is used by the operator for commands such as selecting the two-position component control valve 330 to be operated, but hydraulic flow is controlled by the operator repositioning the truck directional control valve 328.

Figure 7:
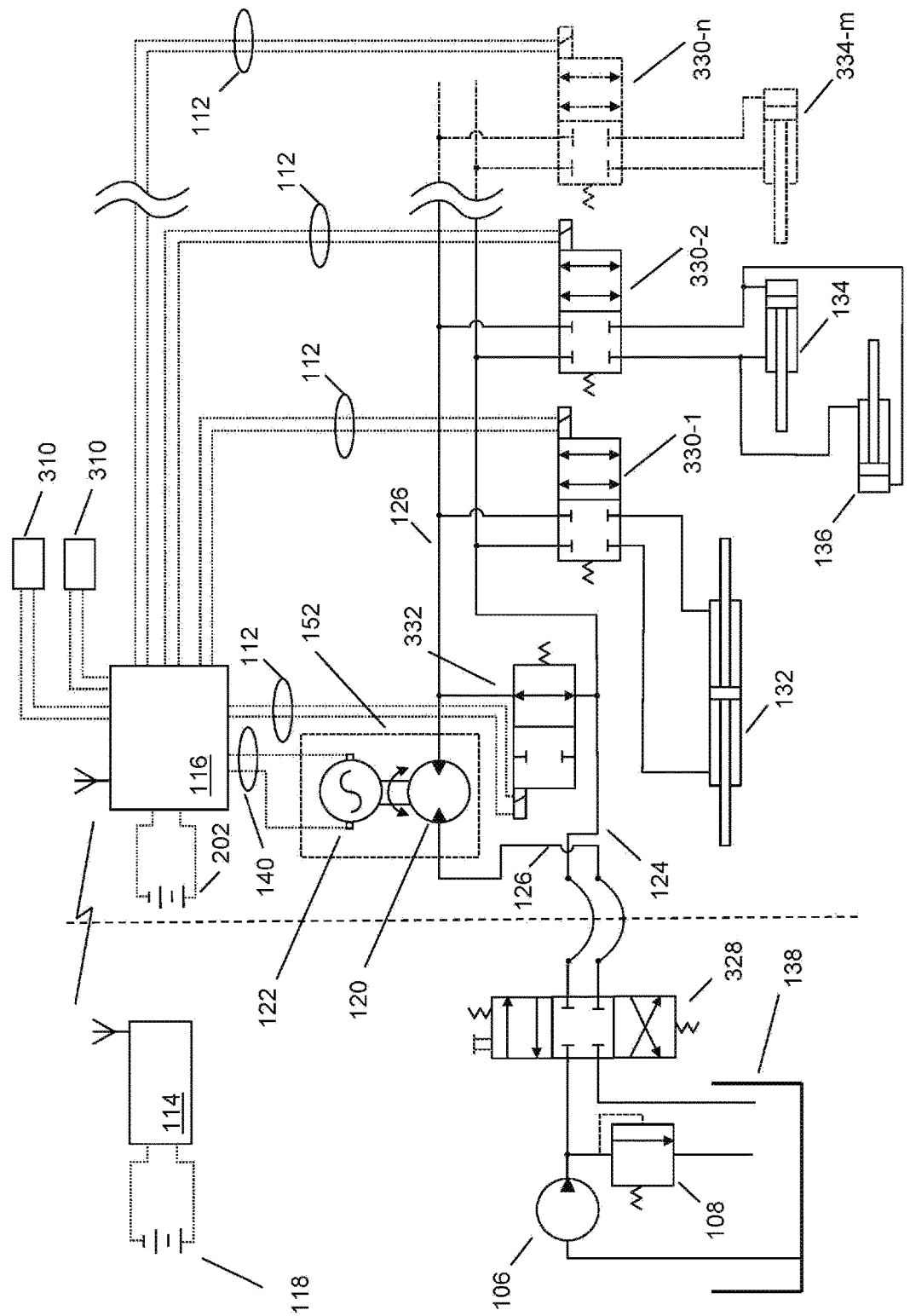
FIG. 7 shows a schematic drawing of an alternative third exemplary embodiment of a parasitic power generator system.

The parasitic energy convertor 152 is coupled in line with the load-handler feed line 124, with the hydraulic inlet to the hydraulic motor 120 coupled to a first portion of the load-handler feed line 124 running towards the hydraulic pump 106 and the hydraulic outlet of the hydraulic motor 120 coupled to a second portion of the load-handler feed line 124 running towards the actuators. In alternative embodiments, the parasitic energy convertor 152 may be coupled in line with the load-handler return line 126, and will work in a similar fashion, the necessary changes being made (see FIG. 7).

An actuator bypass valve 332 is coupled to the load-handler return line 126, coupled to the load-handler feed line 124 between the parasitic energy convertor 152 and the load-handler side actuators in parallel with said actuators. The actuator bypass valve 332 is a solenoid operated, two-position, two-port valve with a normally open (straight-flow) position and a closed position. The normally open position hydraulically couples the load-handler feed line 124 and load-handler return line 126, allowing hydraulic fluid to pass through the actuator bypass valve 332 between the load-handler feed line 124 and the load-handler return line 126. The closed position blocks such flow.

Each two-position component control valve 330 is a solenoid operated, two-position, four-port valve with a normally closed position and a straight-flow (open) position. In the third embodiment system 300 shown in FIG. 5, a first two-position component control valve 330-1 controls operation of the side shifter actuator 132, a second two-position component control valve 330-2 controls the left fork positioner 136 and the right fork positioner 134, while an nth two-position component control valve 330-n controls the mth actuator 334-m. Each two-position component control valve 330 has a first valve port hydraulically coupled to a portion of the load-handler feed line that couples to the hydraulic motor 120, a second valve port hydraulically coupled to a first actuator port on its associated actuator, a third valve port hydraulically coupled to a second actuator port on its associated actuator, and a fourth valve port hydraulically coupled to the load-handler return line 126. Each two-position component control valve 330 has a normally closed position and a straight-flow position. In the straight-flow position, the first and second valve ports are hydraulically coupled, allowing hydraulic fluid to pass between them, and the third and fourth valve ports are hydraulically coupled, also allowing hydraulic fluid to pass between them. In the closed position, all ports are blocked and no hydraulic fluid flows between any of the ports of that valve.

The third embodiment system 300 is configured to operate in several operational states. The third embodiment system 300 has an unpowered stand-by state (shown in FIG. 5) with the hydraulic pump 106 pumping hydraulic fluid, but the truck directional control valve 328 in its normally closed position so the relief valve 108 lifts and returns the hydraulic fluid to the hydraulic fluid reservoir 138. The actuator bypass valve 332 is in its normally open (straight-flow) position and the two-position component control valves 330 are each in their normally closed position.

The third embodiment system 300 also has a powered stand-by state. The powered stand-by state differs from the unpowered stand-by state in that the truck directional control valve 328 is in its flow-through position. Hydraulic fluid from the hydraulic pump 106 flows through the load-handler feed line 124, through the parasitic energy convertor 152, through the actuator bypass valve 332, through the load-handler return line 126, back through the truck directional control valve 328 and returns to the hydraulic fluid reservoir 138. The parasitic energy convertor 152 generates electrical output power, which is sent to the load-side control transceiver 116 over the power wiring 140.

The third embodiment system 300 also has a first actuating state. The first actuating state differs from the powered stand-by state in that the actuator bypass valve 332 is in a closed position and at least one of the two-position component control valves 330 (e.g. two-position component control valve 330-n) is in an open (straight-flow) position while the other two-position component control valves 330 remain closed. Typically, only one of the two-position component control valves 330 is open at a time. Hydraulic fluid from the hydraulic pump 106 flows through the load-handler feed line 124, through the parasitic energy convertor 152, then to one side of the operating actuator, i.e., the actuator associated with the open two-position component control valve 330-*n* (in this example, mth actuator 334-*m*). Hydraulic fluid on the other side of the operating actuator flows back through the open two-position component control valve 330, through the load-handler return line 126, through the truck directional control valve 328 and returns to the hydraulic fluid reservoir 138.

The third embodiment system 300 also has a second actuating state that operates the actuators in a direction opposite that in the first actuating state. In the second actuating state, the truck directional control valve 328 is in its cross-flow position, the actuator bypass valve 332 is in the closed position and at least one of the two-position component control valves 330 (e.g. two-position component control valve 330-*n*) is in an open (straight-flow) position while the other two-position component control valves 330 remain closed. Typically, only one of the two-position component control valves 330 is open at a time. Hydraulic fluid from the hydraulic pump 106 flows through the load-handler return line 126, then to one side of the operating actuator (in this example, mth actuator 334-*m*). Hydraulic fluid on the other side of the actuator flows back through the open two-position component control valve 330, through the load-handler feed line 124, through the parasitic energy convertor 152, through the truck directional control valve 328 and returns to the hydraulic fluid reservoir 138.

During a switch from the first actuating state to the second actuating state, the flow of hydraulic fluid reverses. The hydraulic motor 120 of the parasitic energy convertor 152, originally turning in one direction, slows, stops, then turns in the opposite direction. During this reversal of the hydraulic motor 120, power generation by the electric generator 122 is interrupted momentarily. The truck-side control transceiver 114 powers down, the actuator bypass valve 332 is deactivated to its normally open (straight-flow) position, and any activated two-position component control valves 330 deactivates to its closed position. Then the electric generator 122 resumes electric power generation, the truck-side control transceiver 114 powers up, the actuator bypass valve 332 is reactivated to its closed position and the two-position component control valve 330 reactivates to its open position. The interruption is so brief that a typically user will not notice any significant lag in responsiveness.

In some alternative embodiments, the parasitic energy convertor 152 has a DC power converter that has smoothing capacitors with sufficiently large capacitance so that DC power output voltage does not drop significantly during the reversal and the DC voltage remains sufficient to operate at least the load-side control transceiver 116. In some embodiments, if the DC output voltage drops below a threshold, the load-side control transceiver 116 de-energizes all solenoid operated valves on the load-handler side 104 to conserve power. After the DC output voltage recovers sufficiently, the load-side control transceiver 116 energizes the solenoids for the actuator bypass valve 332 and the two-position component control valve 330 for the operating actuator. In some alternative embodiments, a backup battery to the parasitic energy convertor 152 assists in maintaining DC output voltage at an acceptable level for operation of the load-side control transceiver 116.

When the third embodiment system 300 is in the first or second actuating state and the operating actuator is blocked from further movement, hydraulic fluid flow in the load-handler feed line 124 and load-handler return line 126 slows and then stops, as pressure rapidly increases until the relief valve 108 lifts and the output of the hydraulic pump 106 is dumped directly back into the hydraulic fluid reservoir 138.

At the same time, power generation by the electric generator 122 slows and then stops. The load-side control transceiver 116 does not actively de-energize the solenoid valves of the load-handler side 104 directly, but passively allows the solenoid valves to de-energize when the parasitic energy convertor 152 DC output voltage drops to a point where it is insufficient to maintain the solenoids energized. In some embodiments, the load-side control transceiver 116 has control logic with hysteresis in the DC output voltage thresholds and/or a time delay to prevent chattering of the solenoid operated valves. In some alternative embodiments, the DC output voltage of the parasitic energy convertor 152 drops below a threshold, the load-side control transceiver 116 de-energizes at least the actuator bypass valve 332 and typically the two-position component control valve 330 for any operating actuator as well. The actuator bypass valve 332 goes to its normally open (straight-flow) position and hydraulic fluid flows through the actuator bypass valve 332 and through the hydraulic motor 120 of the parasitic energy convertor 152. After DC output voltage increases sufficiently, the load-side control transceiver 116 energizes the solenoids for the actuator bypass valve 332 and the two-position component control valve 330 for any operating actuator. In other embodiments, the load-side control transceiver 116 receives an indication other than dropping DC voltage that power generation is stopped or will stop and de-energizes the solenoids for the actuator bypass valve 332 and the two-position component control valve 330 for the operating actuator. Such other indications may be a signal from pressure sensors in the load-handler feed line 124 and/or load-handler return line 126.

A typical operation of the third exemplary embodiment parasitic power generation and control system 300 starts with the third embodiment system 300 in an unpowered standby state. The lift truck operator enters commands to the truck-side control transceiver 114 regarding which of the load-handler actuators is to be operated. The operator then repositions the truck directional control valve 328 from the closed position to either the straight-flow or cross-flow position, depending on which direction the operator wants the actuator to move. Hydraulic flow starts in the parasitic energy convertor 152, electric power generation begins, the load-side control transceiver 116 powers up and queries the truck-side control transceiver 114 for the latest commands. Once the command updates have been received, the load-side control transceiver 116 activates the two-position component control valves 330 necessary to carry out the commands as well as the actuator bypass valve 332. The actuators associated with the activated two-position component control valves 330 then move accordingly. When the desired movement has been completed, the operator repositions the truck directional control valve 328 to the closed position. Hydraulic flow stops, the parasitic energy convertor 152 stops producing power, the load-side control transceiver 116 powers down, and the actuator bypass valve 332 deactivates as well as the two-position component control valves 330.

The serial configuration of the third embodiment system 300 (FIG. 5) is superior to the parallel configurations of the first embodiment system 100 (FIG. 3) and the second embodiment system 200 (FIG. 4). In the parallel configurations, the entire flow rate of the hydraulic pump 106 passes through the hydraulic motor 120 while none of the actuators are operating. The hydraulic pump 106 is typically a positive displacement pump with a constant flow rate. The hydraulic pressure varies with the resistance of the hydraulic motor 120, which varies according to the electrical power drawn from the electric generator 122. Thus, hydraulic power (pressure×flow) matches the electrical power drawn. Even at maximum rated power, the power drawn by the electric generator 122 and the hydraulic pressure at the hydraulic motor 120 is far less than the maximum power and pressure the hydraulic pump 106 can deliver. However, when one or more of the actuators is in operation, a substantial portion of the hydraulic flow from the hydraulic pump 106 can flow to the operating actuator (e.g. side shifter actuator 132). The pressure in the load-handler feed line 124 is determined by the parallel resistance of the hydraulic motor 120 and the operating actuator. The resistance the actuator provides to the hydraulic fluid depends on how much resistance the actuator encounters to its movement. If there is low resistance to the actuator's movement, then there is relatively low resistance to the hydraulic fluid flowing to the actuator. Actuators typically encounter low resistance when moving but not in contact with a load, moderate resistance when the actuator is moving the load and high resistance when further movement of the load is blocked. When there is low resistance to the actuator's movement, pressure in the hydraulic line will be low and proportionally more of the hydraulic fluid will flow to the actuator. With low pressure and flow, the hydraulic motor 120 will likely not provide adequate power to meet the electrical power demand experienced by the electric generator 122. This could be corrected by mechanisms for throttling flow to the actuator so that the hydraulic motor 120 receives sufficient flow and pressure, but such a system would be complicated, with multiple sensors, valves and controls. It would also make the actuators slower moving than they otherwise would without the throttling mechanisms and the system would be less efficient as hydraulic power would be lost in the throttling of hydraulic fluid flow.

In the serial configuration of the third embodiment system 300 (see FIG. 5), the entire flow rate of the hydraulic pump 106 always passes through the hydraulic motor 120. The hydraulic power provided by the hydraulic pump 106 equals the sum of the power delivered to the hydraulic motor 120 and to the actuators. The pressure drop across the hydraulic motor 120 will be such that hydraulic power (pressure×flow) matches the electrical power drawn. Power is not lost to the parasitic energy convertor 152 when the actuators are operating, and the actuators are not slowed by hydraulic flow diverted to the parasitic energy convertor 152, though the maximum pressure that can delivered to the actuators is reduced by the pressure drop across the parasitic energy convertor 152.

Fourth Exemplary Embodiment

Figure 6:
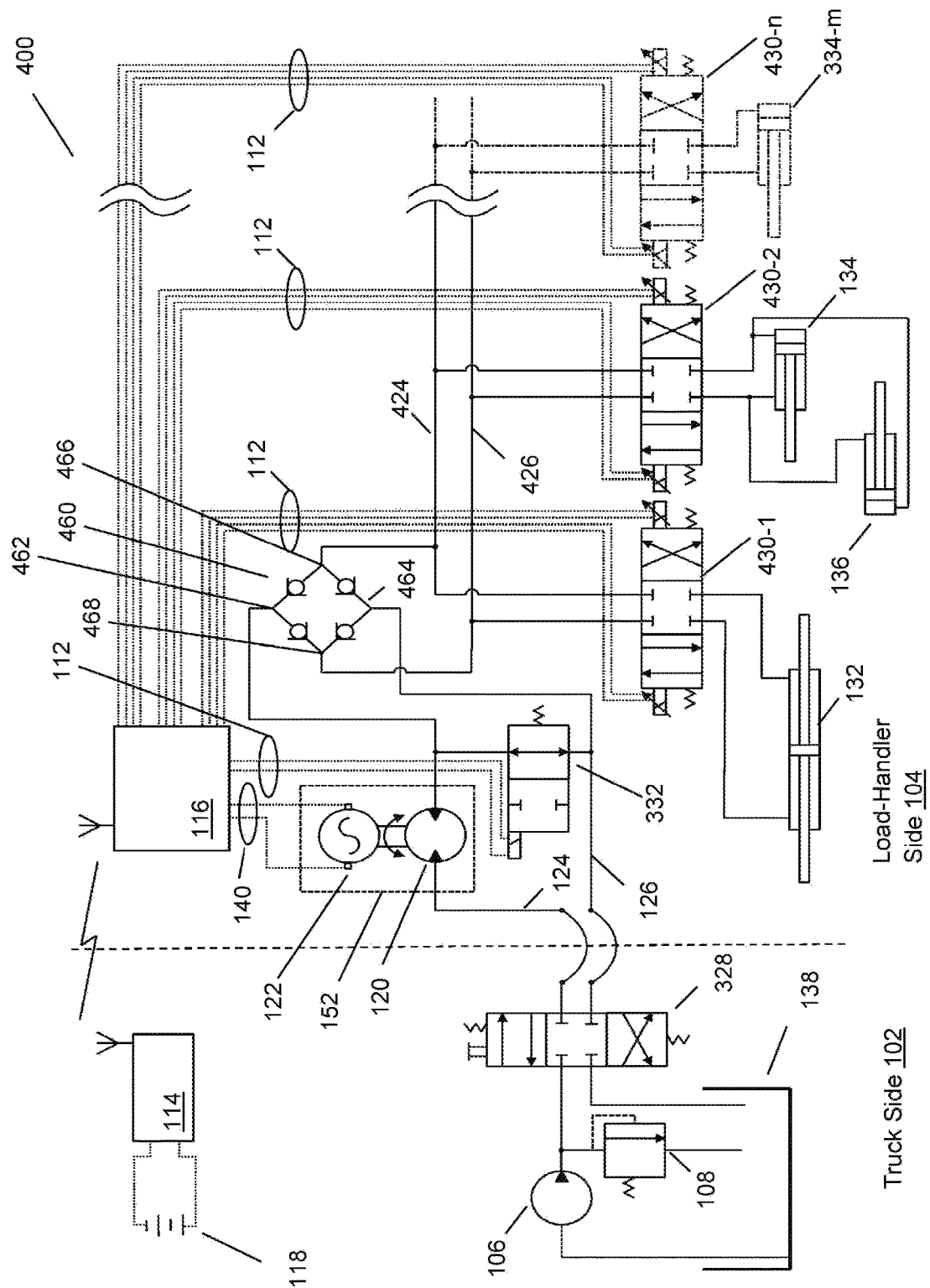
FIG. 6 shows a schematic drawing of a fourth exemplary embodiment of a parasitic power generator system.

FIG. 6 shows a schematic drawing of a fourth exemplary embodiment of a parasitic power generation and control system 400 of a load-handler for a lift truck. The fourth embodiment system 400 is similar to the third embodiment system 300 shown in FIG. 5, but with some differences. The two-position component control valves 330 of the third embodiment 300 are replaced with proportional component control valves 430 (a first proportional component control valve 430-1, a second proportional component control valve 430-2, and an nth proportional component control valve 430-*n*). Each of the proportional component control valves 430 is a solenoid operated, three-position, four-port valve with a normally closed position, a straight-flow position, and a cross-flow position. The proportional component control valves 430 are configured to be throttled open partially or fully in the straight flow or cross-flow positions, typically using either variable current or pulse wave modulated signals.

The fourth embodiment system 400 has a hydraulic rectifier 460 with a first unrectified port 462, a second unrectified port 464, a rectified outlet port 466 and a rectified inlet port 468. The load-handler feed line 124 and load-handler return line 126 hydraulically couple to the first unrectified port 462 and second unrectified port 464 respectively or vice versa. A rectified feed line 424 and a rectified return line 426 hydraulically couple to the rectified outlet port 466 and rectified inlet port 468 respectively. The rectified outlet port 466 and rectified inlet port 468 are hydraulically coupled in series to the set of proportional component control valves 430, which are in parallel to each other. The first unrectified port 462 and second unrectified port 464 are hydraulically coupled in parallel with the actuator bypass valve 332. The combination of the first unrectified port 462 and second unrectified port 464 hydraulically coupled in parallel with the actuator bypass valve 332 is hydraulically coupled in series with the parasitic energy convertor 152.

Figure 8:
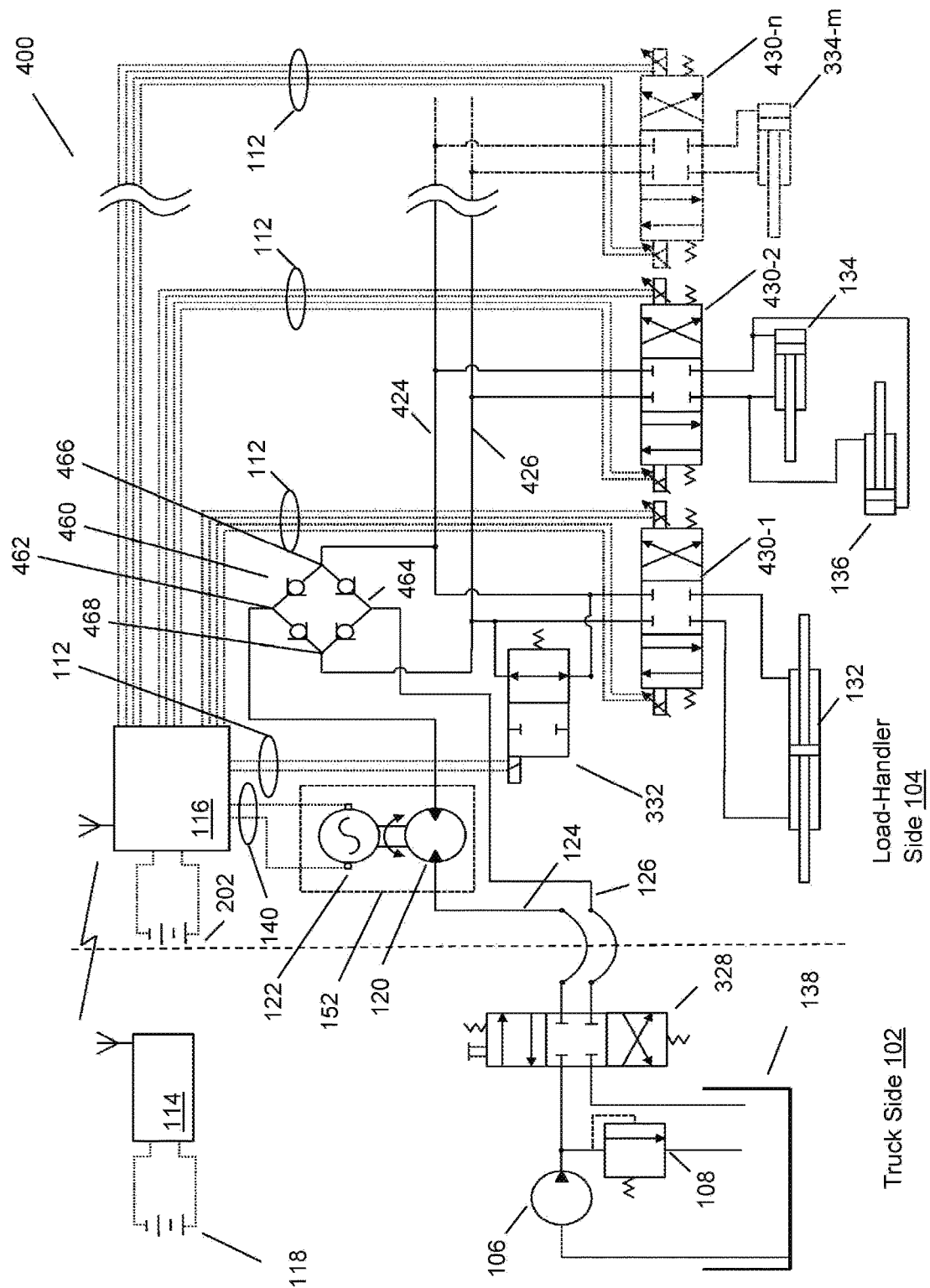
FIG. 8 shows a schematic drawing of an alternative fourth exemplary embodiment of a parasitic power generator system.

In some alternative embodiments, the actuator bypass valve 332 is coupled between the rectified feed line 424 and the rectified return line 426, in parallel with the set of proportional component control valves 430, with this combination in series with the rectified outlet port 466 and rectified inlet port 468 of the hydraulic rectifier 460 (See FIG. 8). In yet further alternative embodiments, the parasitic energy convertor 152 is hydraulically coupled in line to the rectified feed line 424 or the rectified return line 426 and in series with the combination of the actuator bypass valve 332 in parallel with the set of proportional component control valves 430.

Each proportional component control valve 430 is fully independent of the others and the actuators controlled by each proportional component control valve 430 can operate in different directions and speed than the actuators controlled by the other proportional component control valves 430. The lift truck operator enters command into the truck-side control transceiver 114 selecting actuators as well as the desired direction of the actuators. The operator may specify the speed of the actuators as well, but if not, the truck-side control transceiver 114 or the load-side control transceiver 116 assume a default speed. The operator then changes the position of the truck directional control valve 328 to either of the open positions (straight-flow or cross-flow). Hydraulic flow begins through the parasitic energy convertor 152 and the actuator bypass valve 332, power is generated and the load-side control transceiver 116 powers up and queries the truck-side control transceiver 114 for commands. The load-side control transceiver 116 receives the commands and activates the appropriate proportional component control valves 430, in the appropriate direction, and in the appropriate amount for the actuator speed ordered.

The fourth embodiment system 400 does not require a three position, four port control valve on the lift truck, such as the truck directional control valve 328. The fourth embodiment system 400 can work with other types of control valves such as a two-position, four-port valve, similar to the truck control valve 110 in the second embodiment system shown in FIG. 4, since hydraulic flow in the rectified feed line 424 and rectified return line 426 are always in the same directed due to the hydraulic rectifier 460 and flow reversals are handled by each proportional component control valve 430. With a two-position control valve, flow never reverses in the hydraulic motor 120 as the system changes between the first and second actuating configurations, so the parasitic energy convertor 152 does not lose power during reversal of actuator motion. However, most control valves on existing lift trucks are manually operated, three-position, four-port valves like the truck directional control valve 328.

In some embodiments, the load-side control transceiver 116 is configured to sense the direction of hydraulic flow in the load-handler feed line 124 and load-handler return line 126, by hall effect sensors on the shaft 142 or other component of the parasitic energy convertor 152, or by voltage sensor detecting the polarity of the electrical output of the electric generator 122 or by some other sensing device or method. The load-side control transceiver 116 may be configured to use this information about the direction of hydraulic flow in the load-handler feed line 124 as a control input. The truck-side control transceiver 114 only has to send the load-side control transceiver 116 commands on which proportional component control valve 430 to activate, with the load-side control transceiver 116 using the sensed direction of hydraulic flow to determine to position a selected proportional component control valve 430 in the straight flow or cross-flow positions.

In some alternative embodiments, some or all of the proportional component control valves 430 may be replaced with three-position, four port valves that are off/on, not proportional. This is less expensive and less complex, but loses the independent speed control feature.

In some alternative embodiments, the actuator bypass valve 332 is replaced with a passive recirculating orifice that permits a small amount of flow (enough to run the electronics), coupled between the feed lines (124 or 424) and the return lines (126 or 426) at the end of the feed lines (124 or 424) farthest from the hydraulic pump 106. When no component control valves 430 are actuated, a small flow would trickle through the bypass orifice. When the valves 430 are actuated, the flow would instead run through the actuator associated with the valve 430 because the orifice is at the end of the line and has a relatively larger pressure drop than the actuator.

Other Control Transceiver Functions

The existence of a reliable power source on the load-handler 22 opens up possibilities for the load-side control transceiver 116. The load-side control transceiver 116 may perform more sophisticated and complex commands in controlling the actuators and may perform other functions than just control of the actuator control valves. For example, the load-side control transceiver 116 may record a log of events related to the operation of the load-handler 22. Information about events logged by the load-side control transceiver 116 may be based on information from one or more sensors 310 attached to the load-handler 22 and in communication with the load-side control transceiver 116 by wired or wireless connections. The load-side control transceiver 116 may also be configured to accept manual input of information from a user by way of a human/machine interface, such as an application on a personal wireless device such as a cell phone.

The load-side control transceiver 116 may be configured to log time that the load-handler 22 is in use and make notifications based on time in use. For example, the load-side control transceiver 116 may be configured to log when a preventative maintenance action was performed, and trigger a notification when the next performance of that preventative maintenance action is due based on elapsed time in use since the last performance.

The load-side control transceiver 116 may be configured to detect anomalies in the operation of the load-handler 22 and make notifications of the anomalies. For example, the load-side control transceiver 116 may be configured to send notifications in the event of such anomalies as low hydraulic pressure in the load-handler feed line 124, or low voltage on the power wiring 140 from the parasitic energy convertor 152.

Notifications may be communicated by the load-side control transceiver 116 in various ways. For example, the load-side control transceiver 116 may transmit a notification to the truck-side control transceiver 114, which in turn may activate an indicator light or display a message on a screen. Alternatively, the load-side control transceiver 116 may transmit a message to a user's personal mobile device, either directly or indirectly through the truck-side control transceiver 114. Notifications may also be sent to a server operated by the owner of the load-handler 22. The server may be used to track performance metrics and dispatch repair crews based on notifications of anomalies or time in use. The load-side control transceiver 116 may be provisioned with its own IP address which it uses to communicate over an "Internet of Things" (TOT) protocol such as 6LoW-PAN (IPv6 over Low power Wireless Personal Area Networks).

The load-side control transceiver 116 may be configured for more complex and sophisticated controlling of load-handler components. The load-side control transceiver 116 may coupled to sensors that detect the dimensions of a load and then adjust the components of the load-handler accordingly to engage the load. For example, if the load-handler is a carton clamp and has a camera, as the lift truck system approaches a load, images from the camera can be used by the load-side control transceiver 116 to determine the dimensions of the load and open the clamp arms wide enough to fit around the load. Once the load-side control transceiver 116 determines the clamp is positioned around the load, it operates the clamp actuators to grasp and pick up the load.

The load-handler 22 may have various types of sensors mounted thereto and in communication with the load-side control transceiver 116. One type of sensor that may be used is sensors for detection of load location. This would include limit switches, but also cameras and RFID transceivers. Another type of sensor that may be used is sensors for detection of actuator position. Limit switches could be used for this purpose as well. Another type of sensor that may be used is sensors for detection of pressure applied by components of the load-handler 22 on the load. With these sensor inputs, the operator can enter a command on the truck-side control transceiver 114 to perform a series of actions, starting and stopping each action based on sensor inputs. For example, the operator could select a command on the truck-side control transceiver 114 to put the load handler in a predetermined configuration. The load-side control transceiver 116 receives the command and activates the appropriate actuators in the appropriate sequence until position sensors tell it that the load handler components are in the desired locations.

What is claimed is:

1. A system mounted on a load-hander of a lift truck for parasitic power generation and control of the load-handler, comprising:
   a set of load-handler actuators including at least a first load-handler actuator;
   a set of component control valves including at least a first component control valve hydraulically coupled in series with the first load-handler actuator, the first component control valve configured to control hydraulic flow to and from the first load-handler actuator, each of the component control valves hydraulically coupled in parallel with any other of the set of component control valves;

an actuator bypass valve;

a parasitic energy convertor with a hydraulic motor rotationally coupled to an electrical generator, wherein the hydraulic motor is hydraulically coupled in series with a combination of the actuator bypass valve hydraulically coupled in parallel with the set of component control valves; and a load-side control transceiver electrically coupled to and powered by the parasitic energy convertor, electrically coupled to and configured for controlling the actuator bypass valve and the set of component control valves.

2. The system of claim 1 further comprising:

the set of load-handler actuators including a second load-handler actuator; and the set of component control valves including a second component control valve hydraulically coupled in series with the second load-handler actuator, the second component control valve configured to control hydraulic flow to and from the second load-handler actuator, the second component control valves hydraulically coupled in parallel with the first component control valve and any other of the set of component control valves.

3. The system of claim 1 further comprising:

the load-side control transceiver configured to cause the actuator bypass valve to be in a position to block flow when at least one of the set of component control valves is in a position that allows flow.

4. The system of claim 3 further comprising:

the load-side control transceiver configured to cause the actuator bypass valve to be in a position to allow flow and all of the component control valves to each be in a position that blocks flow when electrical output of the electrical generator drops below a threshold.

5. The system of claim 1, wherein the first component control valve is a two-position control valve with a closed position and a straight-flow position.

6. The system of claim 1, wherein the first component control valve is a three-position control valve with a closed position, a straight-flow position and a cross-flow position.

7. The system of claim 1, wherein the first component control valve is a proportional component control valve configured to be throttled in a straight flow position and in a cross-flow position.

8. The system of claim 6 or 7, further comprising:

a hydraulic rectifier with a first unrectified port, a second unrectified port, a rectified outlet port and a rectified inlet port;

the rectified outlet port and rectified inlet port hydraulically coupled in series with the set of component control valves; and the first unrectified port and second unrectified port hydraulically coupled in parallel with the actuator bypass valve.

9. The system of claim 6 or 7, further comprising:

a hydraulic rectifier with a first unrectified port, a second unrectified port, a rectified outlet port and a rectified inlet port;

the rectified outlet port and rectified inlet port hydraulically coupled in series with the combination of the actuator bypass valve hydraulically coupled in parallel with the set of component control valves;

the first unrectified port hydraulically coupled to load-handler feed line; and the second unrectified port hydraulically coupled to load-handler return line.

10. The system of claim 1, further comprising:

a load-handler feed line;

a load-handler return line; and the actuator bypass valve hydraulically coupled to the load-handler feed line and to the load-handler return line between the hydraulic motor and the set of component control valves.

11. The system of claim 10, further comprising:

wherein the actuator bypass valve in a straight-flow position hydraulically couples the load-handler feed line to the load-handler return line; and wherein the actuator bypass valve in a closed position blocks hydraulic flow through the actuator bypass valve.

12. The system of claim 11, further comprising:

the hydraulic motor hydraulically coupled in line with the load-handler feed line.

13. The system of claim 12, further comprising:

a hydraulic inlet of the hydraulic motor hydraulically coupled to a first portion of the load-handler feed line;

a hydraulic outlet of the hydraulic motor hydraulically coupled to a second portion of the load-handler feed line;

the first load-handler actuator having a first actuator port and a second actuator port;

the first component control valve having a first valve port hydraulically coupled to the second portion of the load-handler feed line, a second valve port hydraulically coupled to the first actuator port, a third valve port hydraulically coupled to the second actuator port, and a fourth valve port hydraulically coupled to the load-handler return line; and wherein the first component control valve in a closed position blocks all flow between the valve ports; and wherein the first component control valve in a straight-flow position hydraulically couples the first valve port to the second valve port, couples the third valve port to the fourth valve port.

14. The system of claim 11, further comprising:

the hydraulic motor hydraulically coupled in line with the load-handler return line.

15. The system of claim 14, further comprising:

a hydraulic inlet of the hydraulic motor hydraulically coupled to a first portion of the load-handler return line;

a hydraulic outlet of the hydraulic motor hydraulically coupled to a second portion of the load-handler return line;

the first load-handler actuator having a first actuator port and a second actuator port;

the first component control valve having a first valve port hydraulically coupled to the load-handler feed line, a second valve port hydraulically coupled to the first actuator port, a third valve port hydraulically coupled to the second actuator port, and a fourth valve port hydraulically coupled to the second portion of the load-handler return line;

wherein the first component control valve in a closed position blocks all flow between the valve ports; and wherein the first component control valve in a straight-flow position hydraulically couples the first valve port to the second valve port, couples the third valve port to the fourth valve port.

16. A system mounted on a load-handler of a lift truck for parasitic power generation and control of the load-handler, comprising:
a set of load-handler actuators including at least a first load-handler actuator;
a set of component control valves including at least a first component control valve hydraulically coupled in series with the first load-handler actuator, the first component control valve configured to control hydraulic flow to and from the first load-handler actuator, each of the component control valves hydraulically coupled in parallel with any other of the set of component control valves;
a recirculating orifice configured to have a larger pressure drop than an open one of the set of load-handler actuators;
a parasitic energy convertor with a hydraulic motor rotationally coupled to an electrical generator, wherein the hydraulic motor is hydraulically coupled in series with a combination of the recirculating orifice hydraulically coupled in parallel with the set of component control valves; and
a load-side control transceiver electrically coupled to and powered by the parasitic energy convertor, electrically coupled to and configured for controlling the set of component control valves.

17. A system mounted on a load-handler of a lift truck for parasitic power generation and control of the load-handler, comprising:
a set of load-handler actuators including at least a first load-handler actuator;
a multi-component control valve hydraulically coupled in series with the set of load-handler actuators, the multi-component control valve configured to control hydraulic flow to and from the load-handler actuators;
a parasitic energy convertor with a hydraulic motor rotationally coupled to an electrical generator, wherein the hydraulic motor is hydraulically coupled in parallel with the multi-component control valve;
a directional control valve hydraulically and between the parasitic energy convertor and the multi-component control valve; and
a load-side control transceiver electrically coupled to and powered by the parasitic energy convertor, electrically coupled to and configured for controlling the multi-component control valve and the directional control valve.

18. The system of claim 17 further comprising:
the set of load-handler actuators including a second load-handler actuator hydraulically coupled in parallel with the first load-handler actuator.

19. The system of claim 18,
further comprising a backup battery configured for powering the load-side control transceiver; and
wherein the electric generator is configured for charging the backup battery.

20. The system of claim 19,
wherein the load-side control transceiver is configured for requesting a truck-side control transceiver to set a truck control valve to allow flow from a hydraulic pump to the hydraulic motor when the load-side control transceiver determines that the backup battery requires charging.

21. A load-handler configured for coupling to a lift truck, comprising:
a load-handler feed line configured to be coupled to a hydraulic pump on the lift truck; and
a parasitic energy convertor hydraulically coupled to the load-handler feed line, the parasitic energy convertor configured to be coupled to the load-handler, the parasitic energy convertor configured for generating electrical power for use by one or more components of the load-handler, wherein the parasitic energy convertor comprises a hydraulic motor coupled to an electrical generator; and
a load-side control transceiver coupled to the load-handler, powered by the parasitic energy convertor, configured for controlling load-handler components based on commands received wirelessly from a truck-side control transceiver, wherein the load-side control transceiver is configured for tracking load-handler time in use-logging events and making notifications based on the events and the load-handler time in use.

22. The load-handler of claim 21,
further comprising a backup battery configured to be coupled to the load-handler, the backup battery configured for powering the load-side control transceiver; and
wherein the parasitic energy convertor is configured for charging the backup battery.

23. The load-handler of claim 21,
wherein the load-side control transceiver is configured for making notifications regarding preventative maintenance action based on load-handler time in use.

24. The load-handler of claim 23, further comprising:
a sensor mounted on the load-handler and in communication with the load-side control transceiver, the sensor configured for detecting anomalies during operation of the load-handler; and
wherein the load-side control transceiver is configured for making notifications based on the anomalies detected.

25. The load-handler of claim 23,
wherein the load-side control transceiver is configured with an internet address and configured for sending the notifications to a server over the internet.

26. A load-handler comprising:
a frame;
a load-side control transceiver coupled to the frame, configured tor controlling load-handler components based on commands received wirelessly from a truck-side control transceiver; and
a backup battery configured to be coupled to the frame, the backup battery configured for powering the load-side control transceiver;
a parasitic energy convertor configured for charging the backup battery; and
wherein the load-side control transceiver is configured for tracking load-handler time in use, logging events and making notifications based on the events and the load-handler time in use.

27. The load-handler of claim 26,
wherein the load-side control transceiver is configured for making notifications regarding preventative maintenance action based on load-handler time in use.

28. The load-handler of claim 27, further comprising:
a sensor mounted on the load-handler and in communication with the load-side control transceiver, the sensor configured for detecting anomalies during operation of the load-handler; and
wherein the load-side control transceiver is configured for making notifications based on the anomalies detected.

29. The load-handler of claim 27,
wherein the load-side control transceiver is configured with an internet address and configured for sending the notifications to a server over the internet.

* * * * *